March 30, 1971 — J. M. DE VITTORIO — 3,573,191

APPARATUS FOR RECONSTITUTING ELECTROCOATING BATHS

Original Filed Aug. 24, 1967

INVENTOR.
JOSEPH M. DEVITTORIO
BY
*Lowell G. Wise*
ATTORNEY

United States Patent Office 3,573,191
Patented Mar. 30, 1971

3,573,191
APPARATUS FOR RECONSTITUTING ELECTROCOATING BATHS
Joseph M. De Vittorio, Homewood, Ill., assignor to The Sherwin-Williams Company, Cleveland, Ohio
Original application Aug. 24, 1967, Ser. No. 662,997, now Patent No. 3,499,828, dated Mar. 10, 1970. Divided and this application Nov. 17, 1969, Ser. No. 871,302
Int. Cl. B01k 5/02; C23b 13/00
U.S. Cl. 204—300        8 Claims

ABSTRACT OF THE DISCLOSURE

System for adding replenishment coating material to an electrocoating bath. Electrocoating tank containing dispersion of organic polymeric material in aqueous bath is operated to deposit polymeric coating on conducting surfaces using electrical potential. Coating material is dispersed by primary dispersant to form stable aqueous make-up liquid. Make-up mixed with electrocoating bath containing secondary dispersant. Primary dispersant is minimized in the reconstituted bath while secondary dispersant remains in relatively fixed concentration in the electrocoating bath.

---

Figure 1:
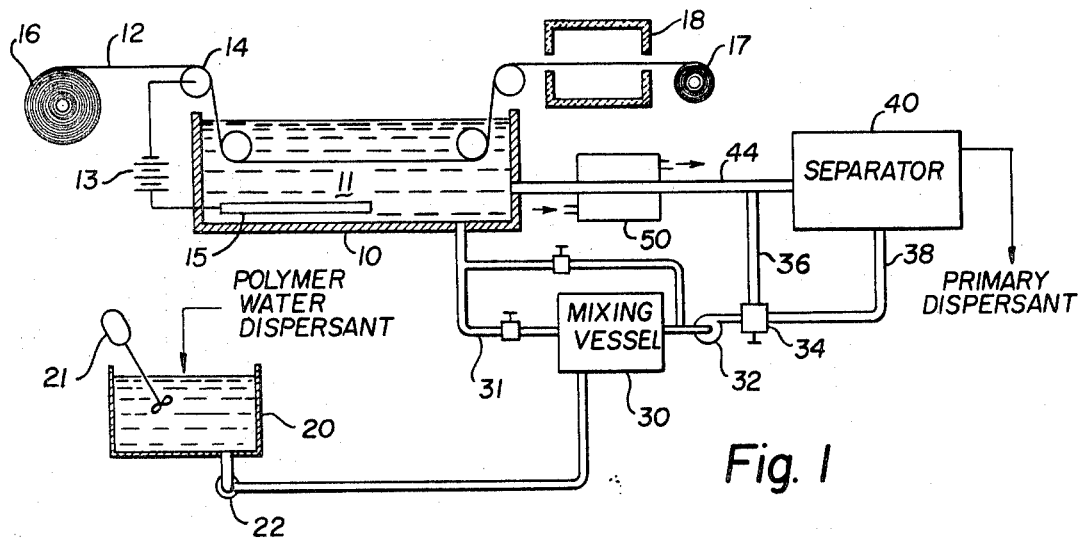

This is a division of application Ser. No. 662,997, filed Aug. 24, 1967, now U.S. Patent 3,499,828, issued Mar. 10, 1970.

DESCRIPTION

This invention relates to electrocoating conductive surfaces by imposing an electrical potential on a substrate in contact with an electrocoating bath containing polymeric material dispersed in an aqueous medium. The polymeric material migrates toward the conductive surface and is deposited as a thin uniform layer. In particular, this invention provides apparatus for reconstituting non-volatile coating materials in the aqueous electrocoating bath and utilizes two dispersing agents having a separation property. A make-up composition is constituted with the polymeric coating material and a primary dispersant. The make-up is mixed with the aqueous electrocoating bath containing a secondary dispersant to maintain the polymeric material in a stable mixture. The use of a volatile primary dispersant, which can be separated from the aqueous coating bath by vaporization while maintaining a sufficient concentration of a second non-volatile dispersant to maintain the polymeric material dispersed in the aqueous medium, provides an economical method for controlling the dispersant concentration in the coating bath.

BACKGROUND OF THE INVENTION

The use of electrocoating to deposit a thin organic film of polymer onto a metal surface has gained increasing acceptance for industrial processes in large scale painting opertions. This process is frequently referred to as electrodeposition or electropainting and relies upon electrical migration phenomenon for adhering a dispersed (or solubilized) polymer from an aqueous dispersion (or solution) onto a metal surface. This process has several advantages over conventional painting methods—formation of a uniform film on all parts of the conducting substrate exposed to the electrocoating bath, ease of mechanization and continuous processing, increased corrosion protection resulting from positive coating of every exposed conductive area, ability of the process to coat articles having complex configurations, conservation of paint due to low drag-out, and elimination of fire hazard and noxious vapors frequently used in other coating systems.

Essentially, electrocoating is a dipping process where an article to be coated is suspended in a tank containing the aqueous bath. Usually, the bath iis considered a colloidal electrolyte, dispersion, solution or mixture of these having a dispersing agent for stabilizing and/or solubilizing the polymeric component of the bath. These polymeric materials are usually pigmented with small inorganic particles and/or insoluble dispersed organic particles which are codeposited with the organic resin-binder.

A typical electrocoating process employs a uniform direct current potential and the surfaces to be coated are biased anodically in the D-C circuit. However, several processes utilize an alternating current superimposed on the D-C potential, or in some instances the conducting substrate to be coated can be the cathodic electrode of the system. The coating bath is relatively resistant to current flow and migration of the colloidal organic polymers is effected by charging the polymeric moiety negatively. In the case of solubilized polymers, such as carboxylic acid resins, the ionization of the polymer in an aqueous medium provides charge sites which can be rendered negative by the addition of alkali metal ions, ammonium ions, or amines. The dispersing phase in the electrocoating bath is water containing ions which establish a desired pH, and the electrical charge of the polymeric particle in relation to the aqueous bath determines the direction of migration under a direct current potential.

Depletion of the polymeric component of the bath requires that the bath be reconstituted with additional polymer continuously, or intermittently, to sustain the solids content of the bath at an operating level. In most electrocoating baths, the dispersing agent (solubilizing material) is retained and becomes more concentrated in the bath after deposition of the dispersed polymeric material on the conductive surface. Ordinarily, the dispersing agent present in the electrocoating bath is added to the reconstituted make-up composition in order to dispersed the polymer in an aqueous phase. In the prior art, addition of new dispersant with the make-up polymer to the electrocoating bath tends to increase the concentration of the dispersant component. Removal of excessive amounts of the dispersant is necessary to maintain a constant material inventory and optimum electrocoating conditions in the bath. In some processes where volatile dispersing agents such as ammonia or amines are the dispersant, evaporation of dispersant from the surface of the bath during electrocoating aids in maintaining an operable concentration of the dispersant. However, this method introduces noxious or undesirable vapors into the atmosphere. In other processes using non-volatile dispersing agents, such as lithium ion, accumulation of these ions is prevented by an expensive separation process, such as dialysis, which adds a considerable cost to the equipment necessary for electrocoating.

SUMMARY OF THE INVENTION

It has been discovered that the use of at least two different dispersant materials can overcome the problem of controlling dispersant concentration in the electrocoating bath effectively. By reconstituting the bath with a make-up liquid containing the polymer material and a primary dispersant separable from the electrocoating bath, this desirable result is achieved.

In a typical process according to this invention, the polymeric coating material is dispersed in water with a volatile primary dispersant, ammonia, for example, and mixed with a sufficient quantity of the electrocoating bath containing secondary dispersant to assure paint stability after removal of the primary dispersant from the aqueous bath mixture. This is achieved by maintaining a uniform concentration of non-volatile secondary dispersant, such as lithium, in the electrocoating tank and continuously withdrawing a portion of the partially depleted bath containing polymer material and secondary dispersant. This portion is mixed with make-up liquid containing primary dispersant. This simple expedient subdivides the make-up liquid into a very fine dispersion or solution which is further stabilized upon its return with the withdrawn portion to the bath. Heretofore, it has not been possible to accomplish make-up addition without developing massive globules of make-up in the main tank or bath. Upon vaporizing the volatile dispersant from the aqueous electrocoating bath, sufficient non-volatile secondary dispersant is maintained to prevent settling or precipitation of the polymeric material. Thus, a continuous process having easily controlled pH and solids content is achieved without dialysis cells or other means for removing excess dispersant.

THE DRAWING

Figure 2:
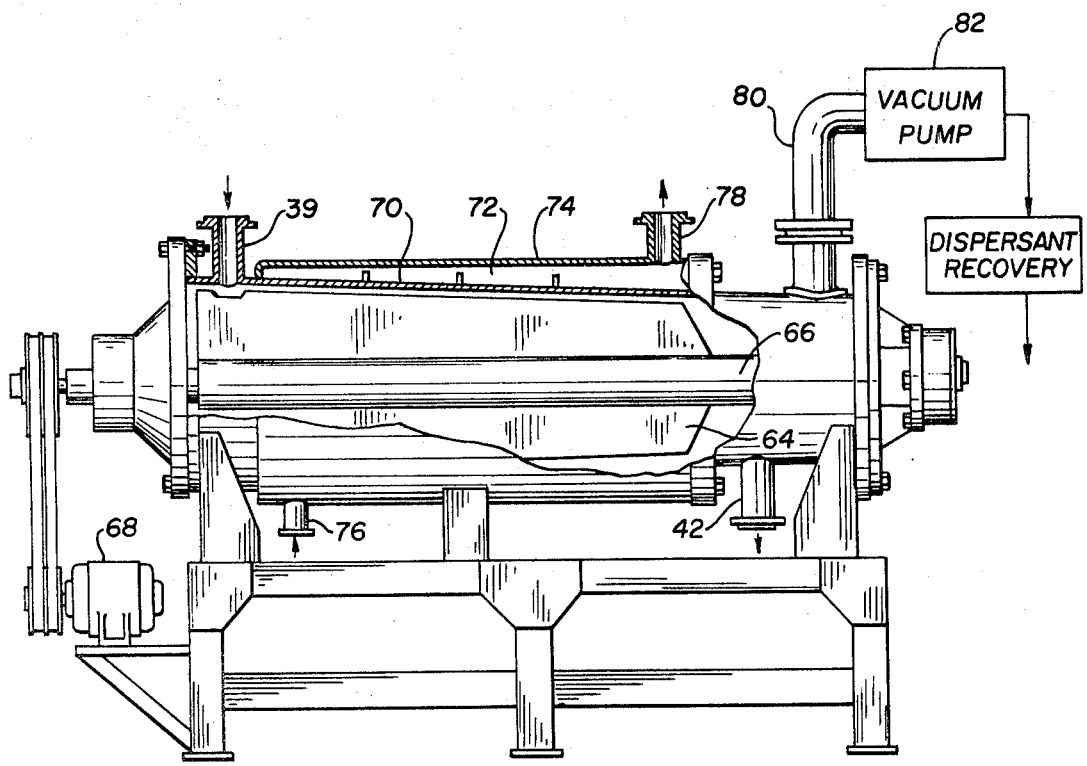

FIG. 1 is a schematic diagram showing the overall system for electrocoating, including the apparatus for dispersing make-up polymer, mixing equipment, and separation equipment. FIG. 2 is a schematic diagram including a cross-sectional view of a typical thin-film evaporator for separating volatile dispersant from the electrocoating bath.

OPERATION AND EQUIPMENT

Referring to FIG. 1, an electrocoating tank 10 in the form of an open vessel is filled with an aqueous electrocoating bath 11. A conducting substrate, such as metal strip 12, is contacted with the electrocoating bath 11 by immersion. A source of direct current potential 13 is connected to the metal surface 12 through conductive contact roller 14. An electrode 15 is biased with an electrical charge opposite to that of the surface 12 to be coated. In FIG. 1, a continuous strip coater is shown by way of example. The metal strip 12 is delivered to the tank 10 by uncoiling the metal from delivery spool 16. Using a series of guide rollers, the metal passes through the bath and is coiled on take-up reel 17. An oven 18 post bakes the coating. The tank size and linear speed of strip determines contact time, usually from a few seconds to a few minutes.

Make-up tank 20 having a suitable mechanical agitation means, such as mixer 21, is used for adding polymeric material and primary dispersant to make-up water. A conduit-defined circulation system connects coating tank 11, make-up tank 20, mixing vessel 30 and separation unit 40. After the make-up liquid is uniformly dispersed, assisted by the presence of the primary dispersant, it is metered through a conduit by pump 22 to mixing vessel 30. The mixing vessel may be an agitated tank or a continuous in-line mixer. A portion of the electrocoating bath 11 is withdrawn from tank 10 through conduit 31 having a suitable flow control means such as a valve or pump for metering flow of depleted bath to the mixing vessel. The proportion of make-up liquid to depleted bath combined in the mixing vessel 30 is adjusted so that the secondary dispersing agent present is sufficient to effect complete dispersal and/or solubilization of the make-up polymeric material is the replenished bath after removal of substantially all of the primary dispersant. A by-pass line 33 can circulate the bath around the mixing vessel when the system operates without addition of make-up.

After thorough mixing of the input streams in the mixing equipment, a uniformly dispersed composition containing primary and secondary dispersants is circulated by pump 32. A three-way valve 34 provides flow control for diverting a part of the mixed dispersant stream past the separation unit through conduit 36. However, the stream need not be split under many conditions of electrocoating. All or part of the stream may be passed through conduit 38 to the separator unit 40, where the primary dispersant is removed while the secondary dispersant remains with the reconstituted aqueous bath. The reconstituted electrocoating bath is recycled through conduit 44 to tank 10. Since a large amount of heating takes place in the tank due to dissipation of electric energy, the bath temperature may be controlled by cooling a withdrawn portion of the aqueous medium. This cooling function can be integrated with the reconstitution apparatus by installing a heat exchanger 50 for cooling the enriched portion of the bath before recycling to the electrocoating tank 10.

In FIG. 2 the enriched bath is fed into the evaporator 40 through inlet 39. The liquid contacts rotor blade 64 which extends from drive shaft 66 driven by motor 68. The liquid is distributed in a thin film on the inner surface of the evaporator wall 70 which is maintained at the desired temperature by fluid 72 circulating between the outside of the evaporator wall 70 and the jacket 74. The fluid 72 for this heating purpose is fed through inlet 76 and outlet 78. The enriched bath liquid can be temperature controlled as it advances toward the outlet of the evaporator. As volatile primary dispersant is vaporized, the gaseous dispersant is withdrawn through vapor outlet 80, which may be connected to a means for reducing pressure such as vacuum pump 82. The volatile dispersant vapors can be recovered, as by absorption of ammonia in water, and reused as a primary dispersant in make-up.

In a typical electrocoating process containing a solubilized polycarboxylic resin, pigment and alkali metal secondary dispersant, the temperature of the electrocoating bath is maintained at about 85° F. during operation. Where ammonia is the primary dispersant, a vacuum of about 5–10 p.s.i.a. is sufficient to remove substantially all of the volatile dispersant from the reconstituted stream at 85° F. or higher. The exact operating conditions for the vaporization step are not critical, and the temperature of the separation can be controlled by heating or cooling the stream with a heat exchange medium in the thin film evaporator shown in FIG. 2.

In normal operation of an open electrocoating tank, volatile components of the bath escape from the surface. Water lost from the system is replaced in the make-up liquid. The fixed secondary dispersant is maintained in stable inventory in the system. Small losses due to dragout, spilling, etc., are replenished when required. This can be achieved by adding small amounts of secondary dispersant to the primary dispersant during make-up or directly to the bath.

Volatile primary dispersant, especially ammonia, is usually driven off from the coating bath 11 due to the concentration of fixed alkali metal ion in the aqueous bath. Thus, any volatile dispersant introduced directly into the coating bath from the make-up step or remaining from the separation step is quickly removed. Secondary dispersant effectively controls the pH of the coating bath at the desired value.

In the prior art processes, where amines and ammonia alone are used, the concentration of volatile dispersant is difficult to control due to their uncontrolled evaporation from the tank. In the present invention, this source of air pollution and material cost is reduced markedly by separating and recovering the volatile dispersants. The air contamination problem for volatile amines is considerably more severe than that of ammonia, and evaporation of large amounts of amine from the bath acn be a serious cause of air pollution. However, it is desirable to reduce losses of all volatile primary dispersants. Here, the volatile dispersant removable or available as a contaminant in the air is related only to the polymeric moiety plated out during a given time period and not to the total polymeric material present in the coating bath, as is the case in known prior art paint elecerodeposition processes.

Some electrocoating processes have a mixture of nonvolatile dispersants, one or more of which may be fixed and remains in the bath and one or more of which may be deposited with the polymeric material.

From the standpoint of simplicity, operating economy and capital expenditure, the preferred method for separating the primary dispersant from the reconstituted bath is vaporization. However, other steps can be utilized, such as selective extraction, sorption, etc. The important property of the system is the existence of a difference in separation characteristics between the primary and secondary dispersants sufficient to enable one to be removed from the reconstituted bath after replenishing the depleted polymeric material with make-up polymer, pigment, additives, etc.

The advantages of the vacuum vaporization step include the anti-fouling nature of thin film evaporators, freedom from extreme changes in temperature, and high performance with little equipment cost and operating expense.

INITIAL BATH COMPOSITION

The start-up of operation for a typical fixed alkali system introduces the inventory of alkali metal ion which is maintained during subsequent operation. The polymer can be a polycarboxylic acid resin, such as described by Gilchrist in U.S. Patents 3,230,162 and 3,304,250. These resins can be dispersed or solubilized by various amines, ammonia or fixed alkali metal. Numerous paint pigments can be incorporated in the bath, including titanium dioxide, carbon black, iron oxide and silaceous materials. The solids content (non-volatile matter) in the electrocoating bath can vary widely, depending upon the composition of the polymeric material. Good coatings can be obtained from baths containing 1 to 32 wt. percent solids, about 2 to 15% being preferred. The addition of sufficient fixed alkali dispersing agent to disperse the polymeric material is included. This usually will bring the pH of the coating bath to about 6.5 to 11, the particular value depending upon the particular bath composition. Several types of polymers are used in electrocoating. Polyesters, acrylics and oil modified resins have been used in the prior art. The widely-used acrylics have an acid number of about 30 to 300, preferably about 60 to 100. Mixed polymers, such as disclosed by Gray in U.S. Patent 2,530,366, can be deposited by electrocoating.

TYPICAL ELECTROCOATING PROCESS

Application of a D-C potential of about 20 to 250 v. D.C. is sufficient to deposit a uniform layer of polymeric material including resin and pigment on a metal substrate. For most materials, a potential of 120 to 175 v. D.C. produces a current density of 1 to 5 amperes/sq. ft. Ordinarily, film thicknesses of about 0.5 to 2 mils are obtained after electrocoating 10 to 100 seconds. Frequently this film is post-baked to cure the polymeric or flow the coating.

Where individual units are being coated, the work-piece is hung by hooks from a conveyor line and connected to the positive side of the D-C supply. The negatively-charged resin particles solubilized by alkali metal ion migrate to the work-piece and lose their charge, adhering tightly to the conductive substrate. Many of the films are self-limiting, and the deposition of polymeric material ceases after a maximum film thickness is reached.

As the coated work-piece is removed from the immersion bath, it is also coated with electrically unaltered coating bath (drag-out) which is rinsed or wiped from the surface. The amount of dragout varies with the concentration and type of coating and work-piece shape.

The electrocoating system can be monitored and controlled automatically. Important bath variables, such as pH, ohmic resistance, solids content and temperature can be sensed continuously or intermittantly and addition of material or thermal changes controlled in response to these readings as described in my co-pending U.S. application Ser. No. 566,056, filed July 18, 1966, and Ser. No. 618,432, filed Feb. 24, 1967.

RECONSTITUTION OF BATH

Continuous or incremental addition of material to the bath to replenish that deposited during electrocoating will be discussed in greatest detail because of its importance to industrial operations. In this instance momentary excess of secondary dispersant is present in the coating bath, and the proportion of make-up to withdrawn bath is a function of the excess dispersant. In some cases the amount of dispersant is determined by stoichiometric requirements of the polymer. The acrylic resins are typical of this type of polymer. In other types of electrocoating polymers, notably the non-ionic resins such as epoxy esters, the fixed dispersant maintains a difference in electrical charge between the dispersed particles and the aqueous medium. In any system, the proportions of make-up to withdrawn bath should be such that removal of the primary dispersant therefrom does not create an unstable deficiency in the concentration of secondary dispersant. Once a finely divided state of the make-up portion is obtained in a relatively large volume of withdrawn bath portion, excess secondary dispersant has been found to hold the enriched batter mixture stable until recycle to the tank without coagulation.

For instance, the continuous withdrawal of a portion of a partially depleted bath having excess fixed dispersant can be mixed with a make-up composition containing a large amount of primary dispersant and an excess over the amount of polymeric material to balance with the available fixed dispersant, after removal of the primary dispersant. Both solids control can be accomplished with a proportioning feeder system which continuously pumps a metered amount of concentrated make-up liquid and a predetermined amount of coating bath into intimate admixture in the system.

The make-up composition can be supplied as a concentrate containing large amounts of non-volatile material, e.g., 50–90 wt. percent and this can be solubilized in water with indicated amounts of primary dispersants, depending upon the nature of the polymeric dispersion, to render the make-up easy to handle hydraulically. The amount of water introduced in the make-up can be adjusted to compensate for that lost from the system by drag-out or by evaporation in the tank or the separator.

By contrast, in prior art electrocoating processes using only fixed alkali dispersants, the make-up polymer is extremely viscous and difficult to handle. In one process the make-up polymer contains about 30% of a diether, such as butyl Cellosolve, to improve fluid handling properties. In this prior art process, part of the diether additive is deposited on the work-piece with the polymer and is vaporized during baking. Also, if such additives are volatile, they escape from the bath surface. The additive does not form a part of the final coating, and the loss of the additive increases the cost of make-up as well as being an objectionable source of atmospheric contamination.

In the present invention, the handling properties of the make-up concentrate can be enhanced by using suitable amounts of primary dispersant, which can be recovered from the separation step and recycled to make-up, thus conserving material in the process, reducing air pollution to a minimum.

EXAMPLE I (A) Typical electrocoating polymer

A water-dispersible pre-polymer is made by reacting 35.7 parts by weight of 2,2,4-trimethyl-1,3-pentandiol, 12.3 parts trimethylol ethane, 11.8 parts isophthalic acid, 13.6 parts trimellitic anhydride, and 26.6 parts azelaic acid. A prepolymer mixture containing 85% solids and 15% butyl Cellosolve is made. The resulting polymer has free hydroxyl groups available for cross-linking and ionizable carboxylic acid groups which are capable of being solubilized by alkali metal ions, ammonium ions or organic bases. The acid value of the prepolymer resin is 53.6.

(B) Initial bath composition

Start-up of an electrocoating process uses an initial aqueous bath composition made by:

Admixing 105 parts of prepolymer resin (A) above with 28.2 parts butyl Cellosolve, and 215 parts lead chromate pigment parts on a roller mill;

Blending the above pigmented polymer with 335 additional parts prepolymer mixture (A), 62.9 parts hexakis (alkoxyalkyl) melamine cross-linking agent, 9 parts $LiOH \cdot H_2O$ dissolved in 81 parts deionized water, and 249 parts deionized water. This mixture is further diluted with sufficient water to obtain a concentration of non-volatile matter (NVM) of 12%. Five parts of water per part of the undiluted mixture provides this concentration. The bath is mixed thoroughly and dispersed in a Cowles mill. The electrocoating bath has a beginning pH of 7.2±0.1.

(C) Depletion

After electrocoating metal surfaces with the pigmented polymer, the bath becomes depleted in coating materials. The pigment particles are deposited at a faster relative rate than the polymer. The cross-linking agent is deposited with the polymer along with part of the butyl Cellosolve. Water and butyl Cellosolve are lost by evaporation from the tank, and portions of all the initial bath are lost through dragout on the coated surface. An estimated 20% of the coating is material adhering to the electrocoated surface and dragged from the immersion bath. Relative to other components, lithium ion remains fixed in the bath, increasing the pH to about 7.6±0.1.

The composition of the make-up is formulated to balance the losses of materials. The depleted bath has a solids content of 10.8 to 11.52% NVM, and the reconstituted bath is returned to the initial NVM value of 12%.

(D) Make-up composition

A concentrated make-up is made by admixing 198 parts by weight of prepolymer mixture (A), 50 parts butyl Cellosolve and 427 parts lead chromate pigment on a roller mill. After thorough mixing, the pigmented polymer is admixed with 507 parts of prepolymer mixture (A), 93 parts melamine cross-linking agent, 29.1 parts triethyl amine volatile primary dispersant, and 36.5 parts 10% aqueous $LiOH \cdot H_2O$. The LiOH is added to replace fixed secondary dispersant lost by dragout and can be added directly to the bath. The make-up concentrate is blended thoroughly on a Cowles mill and/or ultrasonic disperser apparatus. The original NVM of 12% is obtained by adding about 1 part of make-up liquid to each 10 parts of depleted bath. The reconstituted bath pH is 7.5±0.1.

After addition to the depleted bath, the volatile primary dispersant is vaporized. The pH is stable for long periods of time, and ordinary agitation keeps the pigmented polymer adequately dispersed for electrocoating.

EXAMPLE II

The procedure of Example I is followed except that in the make-up, the primary dispersant is 17.0 parts of 17% aqueous ammonia solution. The results are substantially identical with Example I.

EXAMPLE III

Using the initial bath composition and make-up of Example I, a continuous electrocoating process is operated with 1 part make-up metered per 4 parts withdrawn bath. After mixing, the enriched stream is passed to a thin film evaporator at 85°–90° F. Reducing the pressure to 5–10 p.s.i.a., substantially all of the volatile primary dispersant and butyl Cellosolve are removed by vaporization, along with a small quantity of water. The enriched stream is returned to the electrocoating bath after cooling.

While the invention has been illustrated by specific examples, there is no intent to limit the inventive concept except as set forth in the following claims.

What is claimed is:

1. Apparatus for electrocoating a polymeric coating material on a conducting surface comprising:

an electrocoating tank for containing an electrocoating bath;

means associated with said electrocoating tank for immersing conductive surface to be coated into the coating bath;

means for applying an electrical potential to the conductive substrate;

means for dispersing coating material in make-up liquid containing a primary dispersant;

circulation means including conduit connections with said electrocoating tank and said dispersing means for withdrawing a portion of the coating bath from the electrocoating tank and for withdrawing make-up liquid from said dispersing means;

means for mixing the withdrawn electrocoating bath with make-up liquid in pre-determined proportions to form an enriched stable dispersion of the mixture;

separating means operatively connected between said mixing means and said electrocoating tank for removing primary dispersant from the enriched mixture while maintaining secondary dispersant therein to maintain dispersion of the polymeric material; and means for recycling the said enriched mixture containing make-up coating material from the separating means to the electrocoating tank; thereby maintaining the polymeric coating in a predetermined concentration range in the electrocoating tank dispersed by the secondary dispersant without accumulating excessive amounts of dispersants.

2. The apparatus of claim 1 wherein the separating means includes a primary dispersant vaporizer.

3. The apparatus of claim 2 wherein the separating means includes a vacuum pump.

4. The apparatus of claim 1 wherein the circulation means includes a system for continuously metering make-up liquid to the mixing means.

5. The apparatus of claim 1 including a heat exchanger for cooling the coating bath.

6. The apparatus of claim 1 including a continuous system for introducing metal surfaces to be coated into the electrocoating bath and biasing the metal anodically, whereby coating material is deposited at a predetermined rate and removed from the coating bath; means for blending continuous streams of withdrawn coating bath from the tank with make-up liquid; and continuous vaporization means for removing the primary dispersant from the blended streams.

7. The apparatus of claim 6 wherein the vaporization means includes thin film evaporator for removing the volatile primary dispersant from at least a portion of the coating bath containing a non-volatile secondary dispersant.

8. An electrocoating system for maintaining a stable aqueous electrocoating dispersion of water-dispersible polymer by reconstituting the aqueous dispersion with polymer from a make-up material containing a volatile dispersant and displacing the volatile dispersant by a non-volatile dispersant comprising, in operative combination:

(a) an electrophoretic coating tank, having a power supply, a system for immersing electrically conductive articles to be coated in the coating tank, and means for electrically connecting the articles to the power supply;

(b) a makeup tank having means for feeding makeup liquid containing water-disersible polymer and volatile dispersant to the electrocoating system;

(c) liquid circulation means for withdrawing electrocoating dispersion from the coating tank, withdrawing makeup liquid from the makeup tank, and mixing said electrocoating dispersion and makeup liquid to provide reconstituted aqueous mixture containing water-dispersible polymer, volatile dispersant and non-volatile dispersant;

(d) means for vaporizing the volatile dispersant from the reconstituted mixture and separating the volatile dispersant from the reconstituted mixture; and (e) means for recycling the reconstituted mixture from the vaporizing means to the coating tank.

References Cited

UNITED STATES PATENTS

| | | | |
|---|---|---|---|
| 3,157,588 | 11/1964 | Parent, Jr. | 204—299 |
| 3,219,571 | 11/1965 | Parent, Jr., et al. | 204—299 |
| 3,355,373 | 11/1967 | Brener et al. | 204—181 |
| 3,404,079 | 10/1968 | Boardman | 204—181 |
| 3,448,017 | 6/1969 | Chang et al. | 203—92 |

JOHN H. MACK, Primary Examiner

A. C. PRESCOTT, Assistant Examiner